United States Patent [19]

Betzold et al.

[11] Patent Number: 5,041,867
[45] Date of Patent: Aug. 20, 1991

[54] TRANSPORT DEVICE FOR MICROFILM PASSAGE CAMERA

[75] Inventors: Wolfram Betzold, Hoehenkirchen; Karl-Heinz Dietrich; Peter Griessner, both of Munich, all of Fed. Rep. of Germany

[73] Assignee: Agfa-Gevaert AG, Leverkusen, Fed. Rep. of Germany

[21] Appl. No.: 532,969

[22] Filed: Jun. 4, 1990

[30] Foreign Application Priority Data

Jun. 19, 1989 [DE] Fed. Rep. of Germany ....... 3919973

[51] Int. Cl.⁵ .............................................. G03B 27/52
[52] U.S. Cl. .................................................... 355/64
[58] Field of Search ........................... 355/64, 50, 48; 271/184–186

[56] References Cited

FOREIGN PATENT DOCUMENTS 419033 9/1925 Fed. Rep. of Germany .
552394 6/1932 Fed. Rep. of Germany .
1040902 3/1959 Fed. Rep. of Germany .

Primary Examiner—L. T. Hix
Assistant Examiner—D. Rutledge
Attorney, Agent, or Firm—Michael J. Striker

[57] ABSTRACT

A transport device for a microfilm passage camera has a document supply device, and a transport device for further transporting a document in a camera and/or a document discharge device. Each of the document supply device and document transport device have a plurality of rotary members, a plurality of rings arranged so that each of the rotary members abuts against a respective one of the rings, a plurality of transporting rollers arranged so that the rings are mounted in groups on the transporting rollers, a lower guiding sheet limiting from above a document passage and provided with a plurality of perforations through which the rings extend into the document passage. The transporting rollers are driveable with a speed corresponding to filming of a document in the filming station.

15 Claims, 3 Drawing Sheets

TRANSPORT DEVICE FOR MICROFILM PASSAGE CAMERA

BACKGROUND OF THE INVENTION

The present invention relates to a transport device for a microfilm passage camera. More particularly, it relates to such a transport device for a camera which has a document supply device before a filming station, a device for further transportation of documents in the camera and/or a document discharge device.

Microfilm passage cameras of the above mentioned general type are known by devices used on the market. The principle of the document transportation utilized in these devices includes the use of a plurality of driven endless bands and shafts abutting against the bands. This principle has the disadvantage that a uniform document transporation is not reliably ensured. The mechanical construction required for guidance and for drive of the endless bands, which is surrounded by the bands, requires the complete mounting and disassembly for service. The reasons for a non-uniform document transportation which can lead to a non-sharp filing are the following:

1. The drive shaft diameter changes within the manufacturing tolerances over the length of the drive shaft,
2. The manufacturing tolerances result in differences in the thickness of the bands,
3. The shafts which serve for pressing the documents on the bands extend over the whole document width.

The error causes specified in paragraphs 1 and 2 lead to the speed differences between the bands. The error reason specified in paragraph 3 results in a change in the pressing force between, the bands and the document, and particularly so that in the event of a thickness change of the original, for example a staple of documents, the pressing shaft at this location is lifted and thereby at other locations is either lifted or presses stronger.

As a result, different forces can occur at the locations where the original presses on the bands distributed over the original width. The different pressing forces in connection with the different band speeds lead to the fact that the uniform document transportation in the known microfilm passage devices cannot be guaranteed with sufficient reliability.

SUMMARY OF THE INVENTION

Accordingly, it is an object of the present invention to provide a transport device for a microfilm camera which avoids the disadvantages of the prior art.

More particularly, it is an object of the present invention to provide a transport device for a microfilm passage camera in which the pressing force at each location where the document contacts with the drive means is maintained the same as closely as possible, and with a dynamic change of the pressing force at one location, no influence for the remaining pressing points occurs.

It is also an object of the present invention that in the inventive transport device for a microfilm passage camera the differences in the pressing force and in the transportation speed from the manufacturing tolerances are so distributed over the document surface that the uniform document transportation is guaranteed, and the transporting means are arranged so that when service is needed each can be replaced with a minimum of manipulation.

In keeping with these objects and with others which will become apparent hereinafter, one feature of the present invention resides, briefly stated, in a transport device for a microfilm passage camera which comprises a document supply device before a filming station, and a transport device for further transporting a document in a camera and/or a document discharge device, each of the document supply device and document transport device having a plurality of rotary members, a plurality of rings arranged so that each of the rotary members abuts against a respective one of the rings, a plurality of transporting rollers arranged so that the rings are mounted in groups on the transporting rollers, a lower guiding sheet limiting from above a document passage and provided with a plurality of perforations through which the rings extend into the document passage, the transporting rollers being driveable with a speed corresponding to filming of a document in the filming station.

The use of balls as rotary members for pressing elements, and rings as document transporting elements in accordance with another feature of the present invention provides for the advantage that narrow tolerances of these elements can be maintained without high technical expenses. Since the document lies only on the rings, the transporting rollers supporting the rings maintain a tolerance only at the locations where the rings are seated and not over the total length of the transporting roller which makes them cost favorable.

In accordance with another feature of the present invention, the document passage is formed by the lower and upper guiding sheets. Both sheets are provided with a plurality of perforations. While the rings extend through the perforations of the lower guiding sheet, the rotary members extend through the perforations of the upper guiding sheet so that the rings to abut against the rotary members in an abutment point.

In accordance with still another feature of the present invention, each rotary member is formed as a ball which is freely supported in a cage. The cage in turn can have a ring-shaped base and at least three claws extending perpendicularly from and made of one piece with the base.

The inner diameter of the base can be smaller than the diameter of the ball and the inner surface of the base can be conical.

Finally, the rings can have a rectangular cross-section and a surface facing toward the rotary members and possessing a high friction value.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF A PREFERRED EMBODIMENT

In the shown embodiment, the rotary body is formed as a ball.

Figure 1:
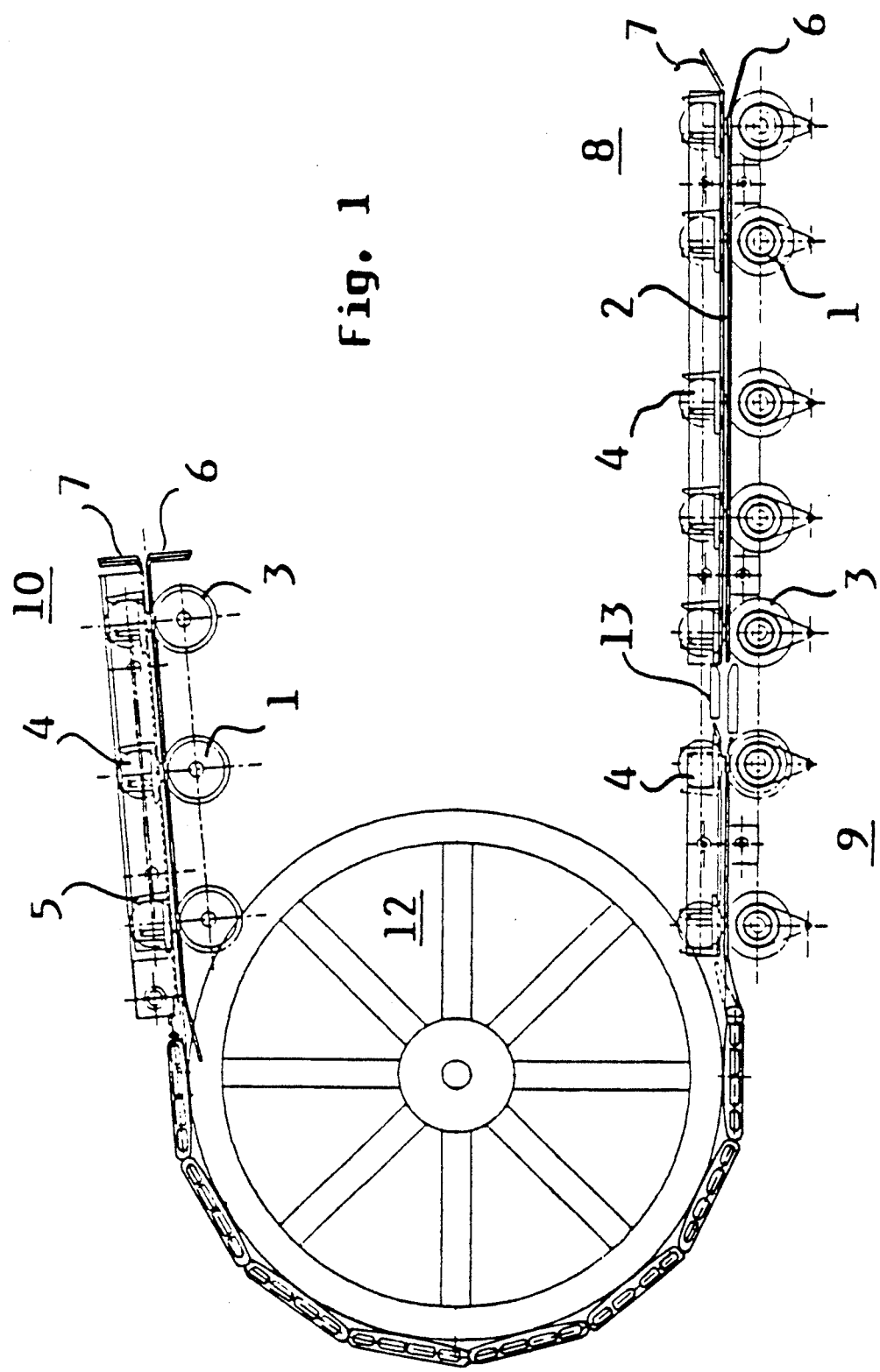
FIG. 1 is a transport device for a view schematically showing a microfilm passage camera in accordance with the present invention with a filming station, a deviating unit and inventive transporting units.
Figure 2:
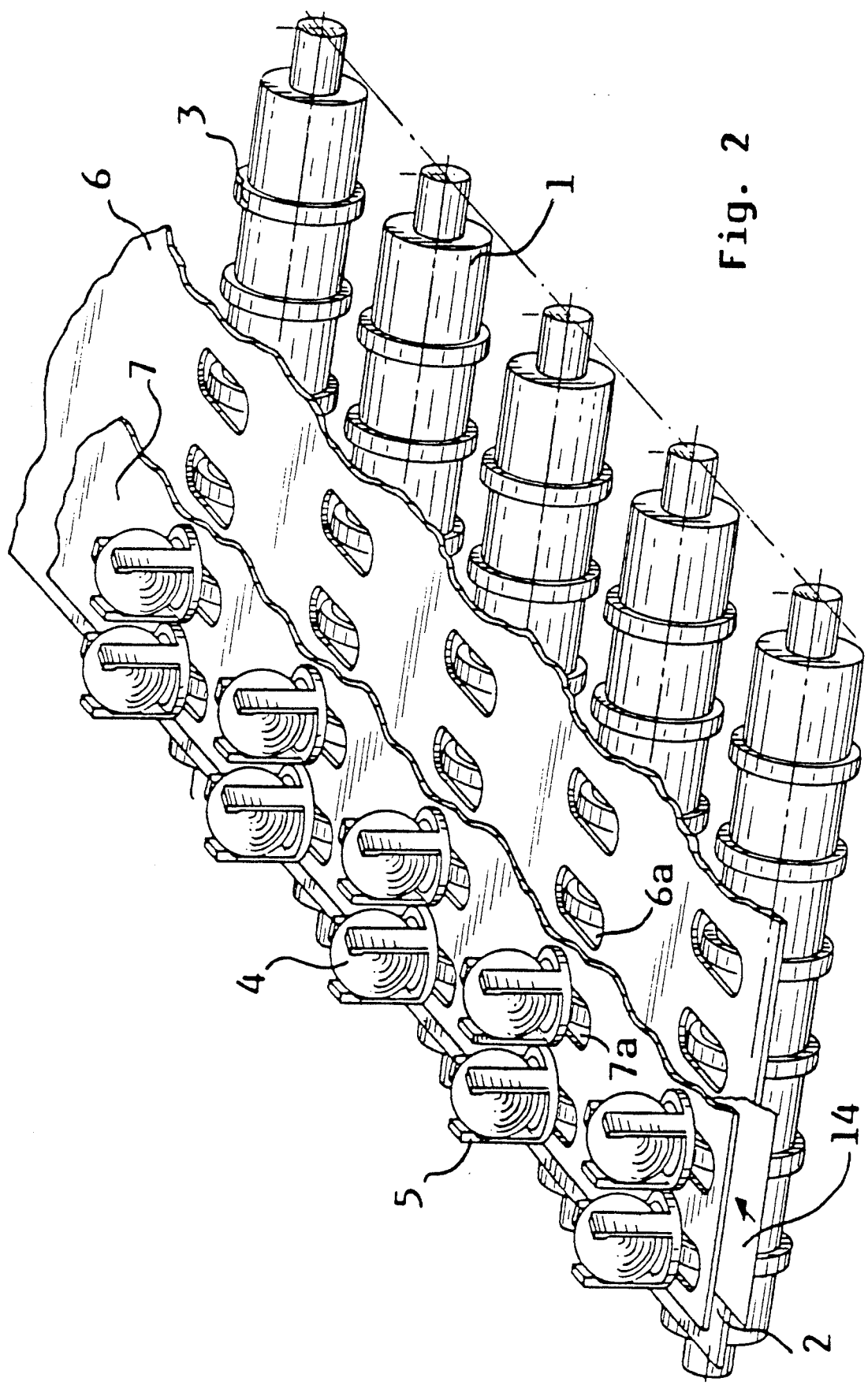
FIG. 2 is a broken view showing a document transporting unit of the inventive transport device for a microfilm passage camera.

A transport device for a microfilm passage camera in accordance with the present invention is schematically shown in FIG. 1. It includes a document supplying device 8, a filming station 13, a document transporting device 9, a deviating device 12 which deviates the documents by approximately 180°, and a document discharging device 10. FIG. 2 shows the construction of the devices 8, 9 and 10 on a partially broken view. Here the transporting rollers 1 are shown. The transporting rollers are provided with rings 3 arranged at identical distances and are rotatably supported fixedly in the apparatus. The drive of the transporting rollers is not illustrated. It can be formed by toothed gears, toothed belts or other known means.

A lower guiding sheet 6 is arranged above the transporting rollers 1. A plurality of perforations 6a are provided in the lower guiding sheet 6. They are arranged so that the rings 3 extend with their upper peripheral regions through the guiding sheet 6 into a document passage 2. The document passage 2 is limited by the lower surface of the lower guiding sheet 6. The other side of the document passage 2 is limited by the upper surface of an upper guiding sheet 7. A plurality of perforations 7a are provided in the upper guiding sheet 7 and are located directly opposite to the perforations 6a. A ball 4 which is freely rotatably supported in a cage 5 extends through each perforations 7a. Its size and weight correspond to other balls 4.

The ball 4 can be composed of steel or another material. Its density is sufficiently high to produce a pressing force with a sufficient weight with the balls of available volumes. It is also possible to provide a pressing force by a suitably arranged magnetic pole.

Figure 3:
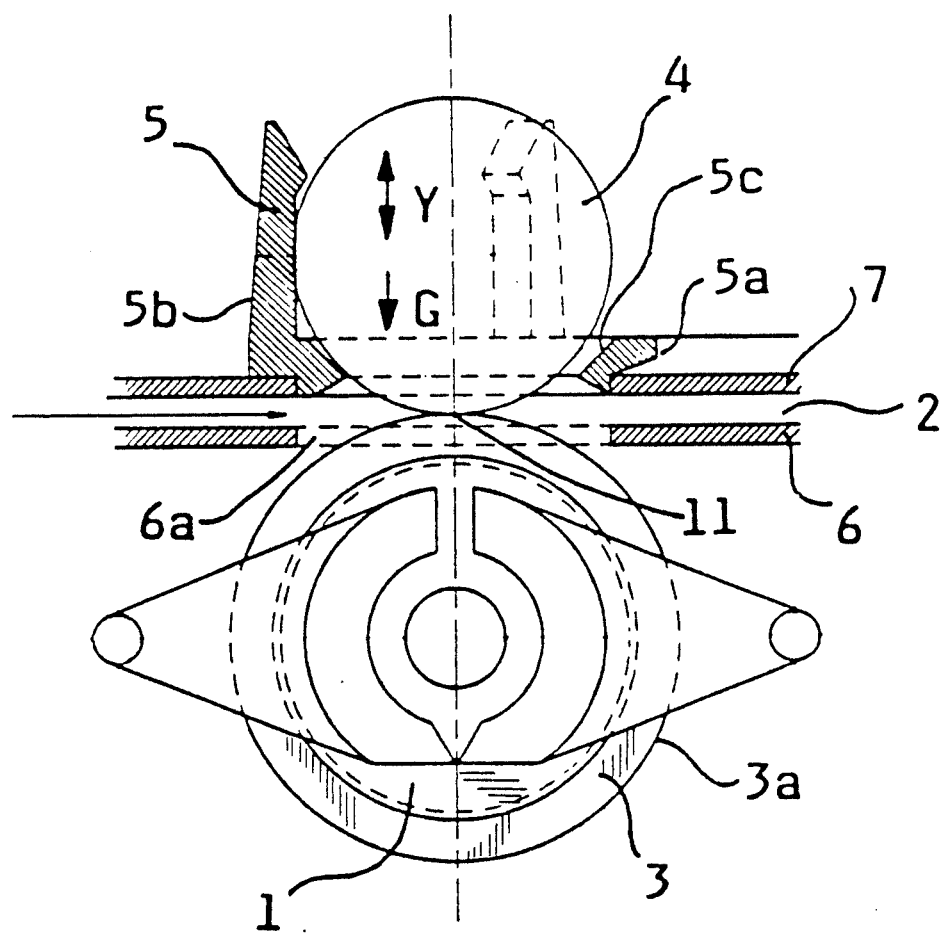
FIG. 3 is a view showing the inventive document transporting unit of FIG. 2 on an enlarged scale.

FIG. 3 shows an enlarged partial view of one of the document transporting units of FIG. 2. It shows a single ball 4 which is supported in a cage 5. The cage 5 has a ring-shaped base 5a with an inner side 5c extending tangentially to the surface of the ball 4. The inner surface 5c has an inner diameter which is smaller than the diameter of the ball 4. At least three claws 6b extend perpendicularly to the base 5a hold the ball 4. Therefore the ball 4 can move only perpendicularly to the plane of the document passage in a direction Y. The cage 5 is inserted in a perforation 7a of the upper guiding sheet 7 and fixedly connected with the latter. The ball 4 abuts against the upper surface 3a of the ring 3 located under it, in an abutment point 11. The ring 3 surrounds the transporting roller 1 which is driveable and arranged stationary in the apparatus at a fixed distance from the guiding sheet 6.

The operation of the document transporting device 8, 9, 10 is as follows:

After turning on of the microfilm passage camera, the transporting rollers 1 are driven in the same direction in a suitable manner. The balls 4 which abut against the surfaces 3a of the rings 3 having a high friction value are rotated in their cages 5 in direction opposite to the transporting rollers 1 or the rings 3 about their own center of gravity. If an operator wants to microfilm a document 14, it supplies the document 14 by a not shown lateral abutment into the document passage 2 of the document supply device 8 which is formed by guiding sheets 6 and 7. The document insertion can be provided also automatically by a document feeder. The front edge of the document 14 contacts the rings 3 which are distributed over the width of the document, and displaced by the operator or the document feeder between the rings 3 and the balls 4.

A friction 4 develops between the surface of the abutment 4 and the surfaces 3a of the rings 3. It is determined by the weight T of the respective balls 4 and the friction value between the document and the ring surfaces. Due to the friction force and the rotation of the transporting rollers 1, the document 14 is pulled by the document supply device 8 and transported to the filming station 13. After the filming station 13 the document 14 is engaged by the document transporting device 9 and supplied to the deviating device 12 which turns the document 14 by approximately 180°. Then, the document 14 is transported to the document discharge device 10. The document discharge device 10 can be formed as disclosed for example in the German patent application P 3,839,854.0-51. It discharges the microfilmed document 14 to a not shown catching container. For distributing special documents 14, additionally a not shown catching container can be provided immediately after the document transporting device.

The uniformity of the document transportation required for an error-free filming is mainly determined by the friction force and the peripheral speed of the rings 3.

The static friction force can be maintained within very narrow limits with a homogeneous document surface and a high friction value of the ring surface 3a. The reason is that the balls 4 can be produced without high technical expenses with high rotational accuracy and a very high weight tolerance.

With an angular speed which is identical for all transporting rollers 1, the peripheral speed of the rings is determined by their thickness and by the diameter of the transporting rollers at the location, at which the ring 3 is seated.

Despite an accurate manufacture with simple means, the rings 3 can have differences in their peripheral speeds due do the tolerances. It is an especial advantage of the inventive arrangement that despite the differences in the peripheral speed, a uniform, straight document transportation is insured.

In the known microfilm passage cameras a difference in the transportation speed of two transporting bands occurs over the whole document length and a weight difference of the pressing rollers occurs over the whole document width. Tolerance difference in the ball weight G and in the thickness of the ring 3, as well as the diameter of the transporting roller 1 at the location where the ring 3 is mounted act only in the associated abutment point 11 and changes from one abutment point to another abutment point. Therefore the differences in the friction force and in the peripheral speed compensate over the document surface and the documents 14 are transported in a uniform and straight fashion.

When due to wear the diameter of the rings changes, they can be exchanged with minimum expenses. For this purpose the rollers must be removed individually, which can be performed both in an axial direction and upwardly.

Rotary bodies can be utilized with other shapes, such as for example short cylinders which abut against rings 3 and have a circular cross-section.

It will be understood that each of the elements described above, or two or more together, may also find a useful application in other types of constructions differing from the types described above.

While the invention has been illustrated and described as embodied in a microfilm passage camera, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A transport device for a microfilm passage camera, comprising a document supply device, and a transport device for further transporting a document in a camera and/or a document discharge device, each of said document supply device and document transport device having a plurality of rotary members, a plurality of rings arranged so that each of said rotary members abuts against a respective one of said rings, a plurality of transporting rollers arranged so that said rings are mounted in groups on said transporting rollers, a lower guiding sheet limiting from above a document passage and provided with a plurality of perforations through which said rings extend into said document passage, said transporting rollers being driveable with a speed corresponding to filming of a document in said filming station.

2. A transport device for a microfilm passage camera as defined in claim 1; and further comprising drive means for driving said transporting rollers with said speed.

3. A transport device for a microfilm passage camera as defined in claim 1; and further comprising an upper guiding sheet which together with said lower guiding sheet forms said document passage.

4. A transport device for a microfilm passage camera as defined in claim 3, wherein said upper guiding sheet has a plurality of perforations which are located opposite to said perforations of said lower guiding sheet, said rotary members extending through said perforations of said upper guiding sheet so that each of said rotary members abuts against a respective one of said rings in an abutment point.

5. A transport device for a microfilm passage camera as defined in claim 4, wherein each of said rotary members is a ball abutting against a respective one of said rings in said abutment point.

6. A transport device for a microfilm passage camera as defined in claim 5, wherein each of said balls abuts against a respective one of said rings in said abutment point under the action of its own weight of said ball.

7. A transport device for a microfilm passage camera as defined in claim 5, wherein each of said balls abuts against a respective one of said rings in said abutment point under the action of a correspondingly arranged magnetic pole.

8. A transport device for a microfilm passage camera as defined in claim 5; and further comprising a cage in which each of said balls is freely rotatably supported and fixed in a plane of said document passage so as to be movable only perpendicularly to said document passage in one direction in said cage.

9. A transport device for a microfilm passage camera as defined in claim 8, wherein said cage is mounted in a respective one of said perforations of said upper guiding sheet, each of said balls having a weight corresponding to the weight of other balls.

10. A transport device for a microfilm passage camera as defined in claim 8, wherein each cage includes a ring-shaped base and at least three claws extending perpendicularly to said ring-shaped base, said claws and said base being formed integrally of one piece with one another.

11. A transport device for a microfilm passage camera as defined in claim 10, wherein said claws and said base are composed of a synthetic plastic material.

12. A transport deice for a microfilm passage camera as defined in claim 10, wherein said base of said cage has an inner diameter which is smaller than a diameter of said ball, said base having an inner side formed as a hollow cone.

13. A transport device for a microfilm passage camera as defined in claim 1, wherein said rings arranged on said transporting rollers and located opposite said rotary members have a rectangular cross-section.

14. A transport device for a microfilm passage camera as defined in claim 13, wherein said rings have a surface facing toward said rotary members and possessing a high friction value.

15. A transport device for a microfilm camera as defined in claim 1, wherein each of said transporting rollers being driveably supported at a fixed distance in said document passage.

* * * * *